United States Patent
Lee et al.

(10) Patent No.: US 7,505,523 B1
(45) Date of Patent: Mar. 17, 2009

(54) INTEGER FREQUENCY OFFSET ESTIMATION BASED ON THE MAXIMUM LIKELIHOOD PRINCIPAL IN OFDM SYSTEMS

(75) Inventors: Jungwon Lee, Stanford, CA (US); Hui-Ling Lou, Palo Alto, CA (US); Dimitrios-Alexandros Toumpakaris, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 613 days.

(21) Appl. No.: 11/031,614

(22) Filed: Jan. 7, 2005

Related U.S. Application Data (60) Provisional application No. 60/600,877, filed on Aug. 12, 2004.

(51) Int. Cl.
H04K 1/10 (2006.01)
(52) U.S. Cl. ........................ 375/260; 375/340
(58) Field of Classification Search ................ 375/260, 375/340; 370/206, 210, 480
See application file for complete search history.

(56) References Cited

U.S. PATENT DOCUMENTS 7,215,636 B2 * 5/2007 Seo et al. .................... 370/208

OTHER PUBLICATIONS

Tim C. W. Schenk et al. "Frequency Synchronization for MIMO OFDM Wireless LAN Systems", IEEE 2003.*
Chen Chen et al "Maximum Likelihood Estimation of Integer Frequency Offset for OFDM" IEEE Mar. 2004.*
"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g/D8.2, Apr. 2003.
"Part 11: Wireless LAN Medium Access Control (MAC) and Physical Layer (PHY) specifications: Higher-Speed Physical Layer Extension in the 2.4 GHz Band", IEEE Std 802.11a-1999.
"Information technology—Telecommunications and information exchange between systems—Local and metropolitan area networks—Specific requirements-Part 11: Wireless LAN Medium Access Control (MAC) and Physical Layer (PHY) specifications", ANSI/IEEE Std 802.11, 1999.
Jan-Jaap van de Beek et al., "ML Estimation of Time and Frequency Offset in OFDM Systems", IEEE Transaction on Signal Processing, vol. 45, No. 7, Jul. 1997, pp. 1800-1805.
Ferdinand Classen et al., "Frequency Synchronization Algorithms for OFDM Systems suitable for Communication over Frequency Selective Fading Channels", IEEE, 1994, pp. 1655-1659.
Jungwon Lee et al., "Effect of Carrier Frequency Offset on OFDM Systems for Multipath Fading Channels".
Jungwon Lee et al., "A Blind Frequency Tracking Algorithm of OFDM Transmission over Frequency Selective Channels".

(Continued)

*Primary Examiner*—David C Payne
*Assistant Examiner*—Leon Flores (57) ABSTRACT

A receiver in an OFDM system may include a maximum likelihood (ML) estimator that estimates the integer part of the carrier frequency offset. The estimator may operate with or without pilot subcarriers. The estimator may calculate the integer frequency offset estimate based on the cyclic shift and phase shift of subcarriers between OFDM symbols.

30 Claims, 6 Drawing Sheets

OTHER PUBLICATIONS

Paul H. Moose, "A Technique for Orthogonal Frequency Division Multiplexing Frequency Offset Correction", IEEE Transactions on Communications, vol. 42, No. 10, Oct. 1994, pp. 2908-2914.

M. Morelli et al., "Frequency Ambiguity Resolution in OFDM Sytems", IEEE Communication Letters, vol. 4, No. 4, Apr. 2000, pp. 134-136.

Thierry Pollet et al., "BER Sensitivity of OFDM Systems to Carrier Frequency Offset and Wiener Phase Noise", IEEE Transactions on Communications, vol. 43, No. 2/3/4, Feb./Mar./Apr. 1995, pp. 191-193.

T.M. Schmidl et al., "Blind Synchronisation for OFDM", Electronics Letters, vol. 33, No. 2, Jan. 16, 1997.

Timothy M: Schmidl et al., "Robust Frequency and Timing Synchronization for OFDM", IEEE Transactions on Communications, vol. 45, No. 12, Dec. 1997, pp. 1613-1621.

William Y. Zou et al., "COFDM: An Overview", IEEE Transactions on Broadcasting, vol. 41, No. 1, Mar. 1995, pp. 1-8.

* cited by examiner

INTEGER FREQUENCY OFFSET ESTIMATION BASED ON THE MAXIMUM LIKELIHOOD PRINCIPAL IN OFDM SYSTEMS

CROSS-REFERENCE TO RELATED APPLICATIONS

This application claims priority to U.S. Provisional Application Ser. No. 60/600,877, filed on Aug. 12, 2004.

BACKGROUND

Wireless systems may use an Orthogonal Frequency Division Multiplexing (OFDM) transmission scheme. In an OFDM system, a data stream is split into multiple substreams, each of which is sent over a subcarrier frequency. Because data is carried over multiple carrier frequencies, OFDM systems are referred to as "multicarrier" systems as opposed to single carrier systems in which data is transmitted on one carrier frequency.

An advantage of OFDM systems over single carrier systems is their ability to efficiently transmit data over frequency selective channels by employing a fast Fourier transform (FFT) algorithm instead of the complex equalizers typically used by single carrier receivers. This feature enables OFDM receivers to use a relatively simple channel equalization method, which is essentially a one-tap multiplier for each tone.

Despite these advantages, OFDM systems may be more sensitive to carrier frequency offset, which is the difference between the carrier frequency of the received signal and the local oscillator's frequency. The carrier frequency offset may be caused by Doppler shift and oscillator instabilities, and can be many times larger than the subcarrier bandwidth.

SUMMARY

The estimator may include a receiver to receive symbols, each symbol including a plurality of data samples, a framer to observe a plurality of data samples in adjacent symbols, and a calculator to calculate an estimate of an integer portion of a carrier frequency offset based on a cyclic shift and a phase shift of the data samples between symbols.

The estimator may calculate the estimate by solving the equation:

$$\hat{l} = \operatorname*{argmax}_{n}\{T(n)\}, \text{ where}$$

$$T(n) = \sum_{k \in S_2} \sigma_z^2 \log\left(\cosh\left(\frac{\Re\{V[k+n]e^{-j2\pi n\alpha}\}}{\sigma_z^2}\right) + \cosh\left(\frac{\Im\{V[k+n]e^{-j2\pi n\alpha}\}}{\sigma_z^2}\right)\right)$$

where n is a symbol index, k is a subcarrier index, $S_2$ is a set of indices for data subcarriers, $\sigma_z^2$ is a variance, $\alpha$ is a cyclic prefix width ratio, and V is an observation vector. Alternatively, the estimator may calculate the estimate by solving the equation:

$$\hat{l} = \operatorname*{argmax}_{n}\left\{\sum_{k \in S_2} \max\{|\Re\{V[k+n]e^{-j2\pi n\alpha}\}|, |\Im\{V[k+n]e^{-j2\pi n\alpha}\}|\}\right\}$$

where n is a symbol index, k is a subcarrier index, $S_2$ is a set of indices for data subcarriers, $\alpha$ is a cyclic prefix width ratio, and V is an observation vector.

In another embodiment, the estimator may calculate the estimate of the integer portion of a carrier frequency offset based on a cyclic shift and a phase shift of the data subcarriers and the pilot subcarriers between OFDM symbols. The estimator may calculate the estimate by solving the equation:

$$\hat{l} = \operatorname*{argmax}_{n}\{T(n)\}, \text{ where}$$

$$T(n) = \sum_{k \in S_1} \Re\{V[k+n]e^{-j2\pi n\alpha} A^*[k]\} +$$

$$\sum_{k \in S_2} \sigma_z^2 \log\left(\cosh\left(\frac{\Re\{V[k+n]e^{-j2\pi n\alpha}\}}{\sigma_z^2}\right) + \cosh\left(\frac{\Im\{V[k+n]e^{-j2\pi n\alpha}\}}{\sigma_z^2}\right)\right)$$

where n is a symbol index, k is a subcarrier index, $S_1$ is a set of indices for pilot subcarriers, $S_2$ is a set of indices for data subcarriers, $\sigma_z^2$ is a variance, $\alpha$ is a cyclic prefix width ratio, V is an observation vector, and A is a sequence known to the receiver. Alternatively, the estimator may calculate the estimate by solving the equation:

$$\hat{l} = \operatorname*{argmax}_{n}\left\{\sum_{k \in S_2} \Re\{V[k+n]e^{-j2\pi n\alpha} A^*[k]\} + \right.$$

$$\left. \sum_{k \in S_2} \max\{|\Re\{V[k+n]e^{-j2\pi n\alpha}\}|, |\Im\{V[k+n]e^{-j2\pi n\alpha}\}|\}\right\}$$

where n is a symbol index, k is a subcarrier index, $S_1$ is a set of indices for pilot subcarriers, $S_2$ is a set of indices for data subcarriers, $\alpha$ is a cyclic prefix width ratio, V is an observation vector, and A is a sequence known to the receiver.

DETAILED DESCRIPTION

Figure 1:
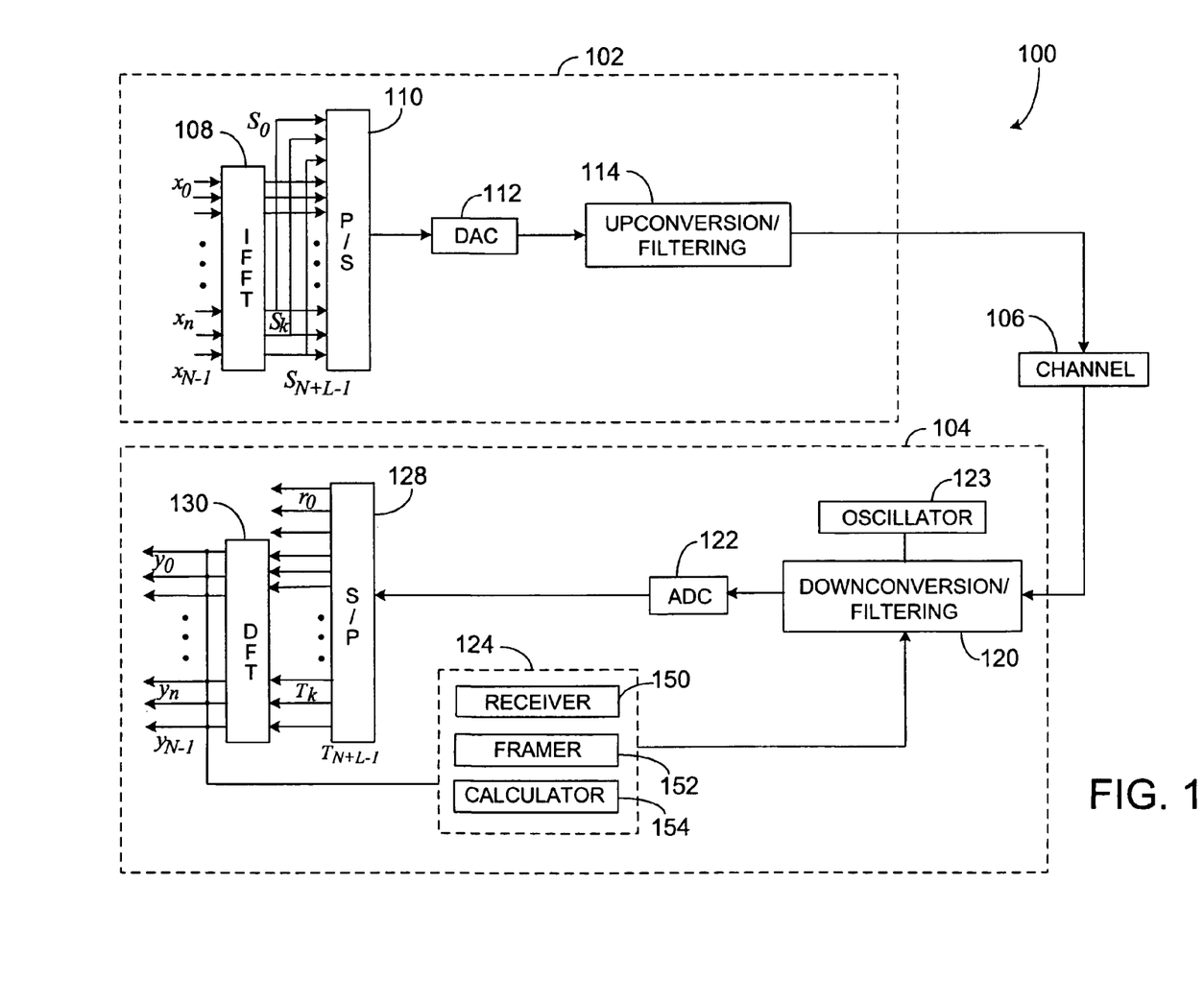
FIG. 1 is a block diagram of a wireless system according to an embodiment.

FIG. 1 shows a wireless communication system 100 according to an embodiment. The wireless communication system includes a transmitter 102 and a receiver 104 that communicate over a wireless channel 106. The transmitter 102 and receiver 104 may be implemented in two different transceivers, each transceiver including both a transmitter section and a receiver section.

The wireless communication system 100 may be implemented in a wireless local Area Network (WLAN) that complies with the IEEE 802.11 standards (including IEEE 802.11a, 802.11g, and 802.11n). The IEEE 802.11 standards describe OFDM systems and the protocols used by such systems.

In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots, 30, 31\}$, where 0 is the DC tone index. The DC tone is not used to transmit information.

The transmitter 102 may generate OFDM symbols for transmission to the receiver 104. An inverse fast Fourier transform (IFFT) module 108 may generate the m-th OFDM symbol $x_m[n]$ by performing an N-point IFFT on the information symbols $X_m[k]$ for $k=0, 1, \ldots, N-1$. A cyclic prefix may be added to the body of the OFDM symbol to avoid interference (ISI) and preserve orthogonality between subcarriers. The cyclic prefix may include copies of the last $N_g$ samples of the N time-domain samples. The cyclic prefix is appended as a preamble to the IFFT of $X_m[k]$ to form the complete OFDM symbol with $N_t=N_g+N$ samples.

The OFDM symbols are converted to a single data stream by a parallel-to-serial (P/S) converter 110 and concatenated serially. The discrete symbols are converted to analog signals by a digital-to-analog converter (DAC) 112 and lowpass filtered for radio frequency (RF) upconversion by an RF module 114.

The OFDM symbols are transmitted through the wireless channel $h_m[n]$ 106 over a carrier to the receiver 104, which performs the inverse process of the transmitter 102. The carrier may be corrupted by Gaussian noise $z_m[n]$ in the channel, which is assumed to be block stationary, i.e., time-invariant during each OFDM symbol.

At the receiver 104, the passband signal is downconverted and filtered by an RF module 120 and converted to a digital data stream by an analog-to-digital converter (ADC) 122.

The RF module includes a local oscillator 123. When the local oscillator frequency $f_l$ is not matched to the carrier frequency $f_c$ of the received signal, a carrier frequency offset $\Delta f = f_c - f_l$ will appear. In addition, there may also be a phase offset $\theta_0$. The received symbol $y_m[n]$ can then be represented as $$y_m[n] = e^{j(2\pi\Delta f(n+m(N+N_g)))T+\theta_0}(h_m[n]*x_m[n]) + z_m[n] \quad (1)$$

where T is the sampling period, and $z_m[n]$ is a zero-mean complex-Gaussian random variable with variance $\sigma_Z^2$.

The frequency offset $\Delta f$ can be represented with respect to the subcarrier bandwidth 1/NT by defining the relative frequency offset $\epsilon$ as $$\varepsilon \triangleq \frac{\Delta f}{1/NT} = \Delta fNT, \quad (2)$$

With the above definition of the relative frequency offset $\epsilon$, the received symbol $y_m[n]$ can be expressed as $$y_m[n] = e^{j\frac{2\pi\varepsilon n}{N}} e^{j2\pi\varepsilon m(1+\alpha)} e^{j\theta_0}(h_m[n]*x_m[n]) + z_m[n], \quad (3)$$

where $\alpha = \frac{N_g}{N}$.

The relative frequency offset $\epsilon$ can be divided into an integer part l and a fractional part $\bar{\epsilon}$ such that $$\epsilon = l + \bar{\epsilon}, \quad (4)$$

where l is an integer and $-\frac{1}{2} \leq \bar{\epsilon} \leq \frac{1}{2}$.

When the fractional frequency offset is equal to zero, the discrete Fourier transform (DFT) of $y_m[n]$ can be expressed as $$Y_m[k] = e^{j(2\pi lm\alpha + \theta_0)} H_m[k-l] X_m[k-l] + Z_m[k] \quad (5)$$

where $H_m[n]$ and $Z_m[n]$ are the DFTs of $h_m[n]$ and $z_m[n]$, respectively. In Equation (5) it is assumed that $H_m[n]$ and $X_m[n]$ are periodic with period N to simplify the notation. Similarly, $Y_m[n]$ is also be assumed to be periodic.

As can be seen in Equation (5), the integer frequency offset l causes a cyclic shift and a phase change of the received signal. In an embodiment, an estimator 124 may be used to estimate the integer frequency offset l. The fractional part $\bar{\epsilon}$ of the relative frequency offset may be calculated separately. The estimated integer frequency offset l may be fed back to the downconverter 120 to correct any cyclic shift in the subcarriers. The data stream is then converted into parallel substreams by a serial-to-parallel (S/P) converter 128 and transformed into N tones by an FFT module 130.

In an embodiment, the estimator 124 may perform either pilot-aided estimation or blind estimation of the integer frequency offset l, i.e., with or without the aid of pilot subcarriers. In a pilot-aided OFDM system, the subcarriers include pilot subcarriers, data subcarriers, and unused subcarriers. In a blind OFDM system, the subcarriers do not include pilot subcarriers and the estimators utilize redundant information in the data subcarriers to estimate the carrier frequency offset.

In the following equations, $S_1$ and $S_2$ represent the set of indices for pilot subcarriers and data subcarriers, respectively. The number of elements in $S_1$ and $S_2$ are $N_1$ and $N_2$, respectively. Depending on the particular OFDM system and OFDM symbol, $N_1$ or $N_2$ may be zero.

The transmit symbols satisfy the following relationship:

$$X_m^*[k]X_m[k] = \begin{cases} A_m[k] \text{ for } k \in S_1 \\ B_m[k] \text{ for } k \in S_2 \end{cases}, \quad (6)$$

where $A_m[k]$ is a sequence known to the receiver, $B_m[k]$ is a random sequence unknown to the receiver, and $A_m[k]$ and $B_m[k]$ are assumed to have power of 1.

In an embodiment, the ML estimator for the integer frequency offset l is derived for the additive white Gaussian noise (AWGN) channel. For the AWGN channel, the received signal can represented as follows:

$$Y_m[k] = e^{j(2\pi lm\alpha + \theta_0)} X_m[k-l] + Z_m[k] \quad (7)$$

Since the phase $\theta_0$ is unknown to the receiver, $Y_m[k]$ is multiplied by $Y_{m-1}^*[k]$ to remove the phase term $\theta_0$ from the desired signal $X_m^*[k-l]$ and $X_{m-1}[k-l]$:

$$V_m[k] = Y_{m-1}^*[k]Y_m[k] \quad (8)$$

$$= e^{j2\pi lm\alpha} X_{m-1}^*[k-l] * X_m[k-l] + Z_m[k]$$

where the noise $Z_m'[k]$ is $$Z_m'[k] = e^{-j(2\pi l(m-1)\alpha+\theta_0)}X_{m-1}^*[k-l]Z_m[k] + \qquad (9)$$
$$e^{j(2\pi lm\alpha+\theta_0)}X_m[k-l]Z_{m-1}^*[k] + Z_{m-1}^*[k]Z_m[k]$$

For the derivation of a closed-form ML estimator, it may be assumed that $Z_{m-1}^*[k]Z_m[k]$ is negligible compared to the other terms in Equation (9). This assumption may be valid when the SNR is high. Under this assumption, $Z_m'[k]$ will approximately follow a Gaussian distribution.

The estimator 124 performs an ML estimation of the integer frequency offset using samples in an observation window. Let V be an observation vector comprised of the observations $V_m[0], V_m[1], \ldots, V_m[N-1]$, i.e., $V=[V_m[0]V_m[1]\ldots V_m[N-1]]$. The ML estimate of l given the observation V is the integer n that maximizes the following statistic:

$$T_l(n) = f(V|l=n), \qquad (10)$$

where $f$ is the conditional probability density function (pdf) of V given $l=n$. Since the observation vector V depends not only on the integer frequency offset l but also on the values of the data symbols $B_m[k]$ for $k_i \in S_2$, the conditional pdf $f(V|B=b,l=n)$ can be rewritten as follows:

$$T_1(n) = \sum_{\text{all\_b}} f(V \mid B=b, l=n)P\{B=b\}, \qquad (11)$$

where $B=[B_m[k_1], B_m[k_2], \ldots, B_m[k_{N_2}]]$ for $k_i \in S_2$ and $b=[b_m[k_l], b_m[k_2], \ldots, b_m[k_{N_2}]]$ represents the actual value assumed by the random vector B. It may be assumed that the data subcarriers are modulated using the quadrature phase shift key (QPSK) technique. The ML estimator for the other constellations can be derived in a similar manner.

Since $P\{B=b\}=2^{-2N_2}$ for QPSK, the following $T_2(n)$ can be used instead of $T_1(n)$ for the ML estimation:

$$T_2(n) = \sum_{\text{all\_b}} f(V \mid B=b, l=n). \qquad (12)$$

Since the received signal in each subcarrier is independent of one another, the conditional pdf $f(V|B=b,l=n)$ becomes $$f(V \mid B=b, l=n) = \qquad (13)$$
$$\prod_{k \in S_1} f_{z'}(V[k+n] - e^{j2\pi n\alpha}A[k]) \cdot \prod_{k \in S_2} f_{z'}(V[k+n] - e^{j2\pi n\alpha}b[k])$$

where $$f_{z'}(x) = \frac{1}{2\pi\sigma_Z^2} e^{\frac{-|x|^2}{2\sigma_Z^2}}. \qquad (14)$$

From Equation (14), it can be shown that $$f_{z'}(V[k+n] - e^{j2\pi n\alpha}A[k]) = \qquad (15)$$

$$\frac{1}{2\pi\sigma_Z^2} e^{-\frac{|V[k+n]|^2+|A[k]|^2}{2\sigma_Z^2}} e^{\frac{\Re\{V[k+n]e^{-j2\pi n\alpha}A^*[k]\}}{\sigma_Z^2}},$$

where $\Re\{x\}$ denotes the real part of x. Using the expression in Equation (13) and removing all factors that are independent of n, it can be shown that the ML estimator maximizes $T_3(n)$:

$$T_3(n) = \qquad (16)$$
$$\sum_{\text{all\_b}} \left( \prod_{k \in S_1} e^{\frac{\Re\{V[k+n]e^{-j2\pi n\alpha}A^*[k]\}}{\sigma_Z^2}} \right) \left( \prod_{k \in S_2} e^{\frac{\Re\{V[k+n]e^{-j2\pi n\alpha}b^*[k]\}}{\sigma_Z^2}} \right)$$

Since each $b[k_i]$ for $k_i \in S_2$ can take only the values $\pm 1$ and $\pm j$ and the $b[k_i]$ values are independent of one another, $T_3(n)$ can be rewritten as $$T_3(n) = \prod_{k \in S_1} e^{\frac{\Re\{V[k+n]e^{-j2\pi n\alpha}A^*[k]\}}{\sigma_Z^2}} \cdot \qquad (17)$$
$$\prod_{k \in S_2} 2\left(\cosh\left(\frac{\Re\{V[k+n]e^{-j2\pi n\alpha}A^*[k]\}}{\sigma_Z^2}\right) + \cosh\left(\frac{\Im\{V[k+n]e^{-j2\pi n\alpha}A^*[k]\}}{\sigma_Z^2}\right)\right)$$

where $\Im\{x\}$ denotes the imaginary part of x. By taking the logarithm of $T_3(n)$, removing the constant terms, and multiplying by $\sigma_Z^2$, it can be shown that the ML estimate of the integer frequency offset given the observation V is $$\hat{l} = \arg\max_n \{T(n)\}, \qquad (18)$$

where $$T(n) = \sum_{k \in S_1} \Re\{V[k+n]e^{-j2\pi n\alpha}A^*[k]\} + \qquad (19)$$
$$\sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

for a pilot-aided estimator (PAE) and $$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right) \qquad (20)$$

for a blind estimator (BE).

As will be appreciated, the processes and techniques described herein can be implemented, at least in part, using a computer program. A computer program can be encoded on a computer-readable medium and be operable to cause data processing apparatus to perform one or more operations, as described herein.

Figure 2:
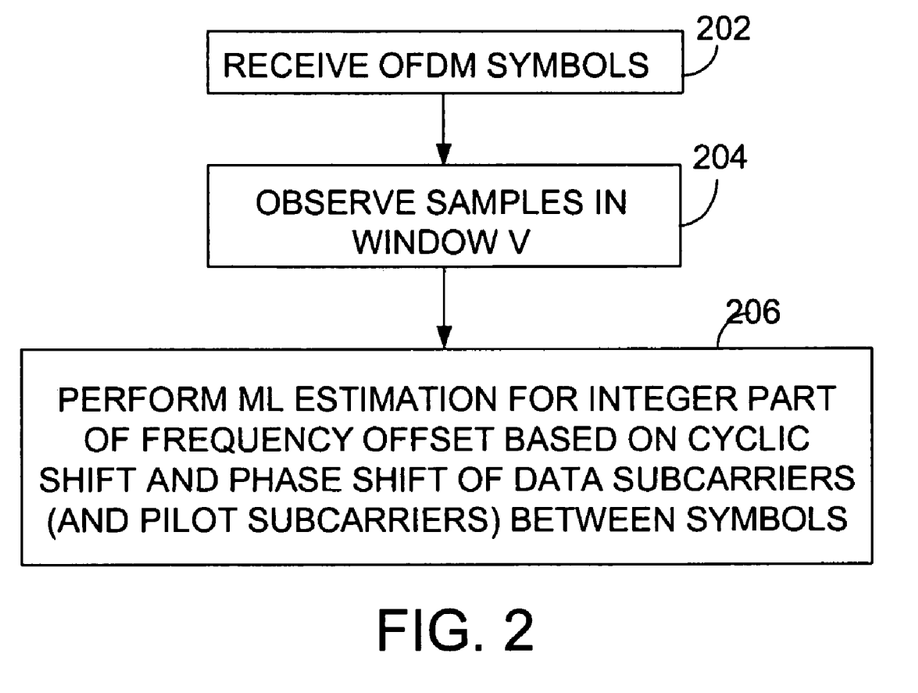
FIG. 2 is a flowchart describing an integer carrier offset estimation operation according to an embodiment.

FIG. 2 is a flowchart describing an ML estimation of the integer frequency offset according to an embodiment. The receiver 104 receives OFDM symbols from the channel (block 202). The cyclic prefix is removed and FFT performed on the symbols. The estimator 124 then observes samples in the observation window V (block 204). The estimator 124 uses the fact that the integer carrier frequency offset causes a phase shift over two OFDM symbols and a cyclic shift of the subcarriers to calculate the estimated integer frequency offset (block 206). The cyclic shift of the subcarriers is reflected on the shift of the index of V[k] in the calculation of T(n), whereas the phase shift over two OFDM symbols is exploited as follows. In the first summation in Equation (19), each term measures the component of the observation V[k+n] for $k_t \in S_1$ in the direction of $e^{j2\pi n\alpha}A[k]$. In the absence of noise, each term should be equal to 1 when the estimate is equal to the actual integer frequency offset l. However, it will have a value less than 1 when the estimate n is different from l. In the second summation, each term measures the magnitude of the observation V[k+n] for $k_t \in S_2$ in the direction of $\pm e^{j2\pi n\alpha}$ and $$\pm e^{j(2\pi n\alpha + \frac{\pi}{2})}$$

and takes the average with a function comprised of log and cosh. In the absence of noise, each term should be equal to $$\sigma_Z^2 \log\left(\cosh\left(\frac{1}{\sigma_Z^2}\right)\right)$$

when $(n-1)\alpha$ is an integer multiple of $$\frac{1}{4}.$$

It will have a smaller value otherwise.

The estimator 124 can use the ML estimator of Equations (18), (19), and (20) to perform "exact" ML estimation of the integer frequency offset. The estimator may also perform an approximate ML estimation of the integer frequency offset by simplifying the statistic T(n) for high SNR. Equation (19) can be simplified by noting that $$\cosh(x) + \cosh(y) = \frac{1}{2}(e^x + e^{-x} + e^y + e^{-y}) \quad (21)$$

$$\approx \frac{1}{2} e^{\max\{|x|,|y|\}},$$

for $|x|>>|y|>>0$ or $|y|>>|x|>>0$. With this approximation, the pilot-aided estimator (PAE) can be represented as:

$$\hat{l} = \underset{n}{\operatorname{argmax}}\left\{\sum_{k\in S_1} \Re\{V[k+n]e^{-j2\pi n\alpha}A^*[k]\} + \right. \quad (22)$$

-continued $$\left. \sum_{k\in S_2} \max\{|\Re\{V[k+n]e^{-j2\pi n\alpha}\}|, |\Im\{V[k+n]e^{-j2\pi n\alpha}\}|\}\right\}.$$

For a blind estimator (B), Equation (21) becomes $$\hat{l} = \underset{n}{\operatorname{argmax}}\left\{\sum_{k\in S_2} \max\{|\Re\{V[k+n]e^{-j2\pi n\alpha}\}|, |\Im\{V[k+n]e^{-j2\pi n\alpha}\}|\}\right\}. \quad (23)$$

The performance of the exact ML estimators of Equations (18), (19), and (20) and the approximate ML estimators of Equations (22) and (23) are compared with the performance of known PAEs and BEs in FIGS. 3-6. The known estimators are described in T. M. Schmidl and D.C. Cox, "Blind synchronisation for OFDM," Electronics Letters, vol. 33, pp. 113-114, January 1997, T. M. Schmidl and D.C. Cox, "Robust frequency and timing synchronization for OFDM," IEEE Trans. Commun., vol. 45, pp. 1613-1621, December 1997, M. Morelli, A. N. D'Andrea, and U. Mengali, "Frequency ambiguity resolution in OFDM systems," IEEE Commun. Lett., vol. 4, pp. 134-136, April 2000.

Schmidl's PAE is given by $$\hat{l} = \underset{n}{\operatorname{argmax}}\left\{\left|\sum_{k\in S_2} V[k+n]A^*[k]\right|^2\right\}, \quad (24)$$

and Schmidl's BE is given by $$\hat{l} = \underset{n}{\operatorname{argmax}}\left\{\sum_{k\in S_2} \frac{(V[k]e^{-j2\pi n\alpha})^4}{|V[k]|^3}\right\}. \quad (25)$$

Morelli's PAE is given by $$\hat{l} = \underset{n}{\operatorname{argmax}}\left\{\sum_{k\in S_1} \Re\{V[k+n]e^{-j2\pi n\alpha}A*[k]\} + \frac{1}{2}\sum_{k\in S_1 \cup S_2}\sum_{i=m-1}^{m}|Y_i[k+n]|^2\right\},$$

and Morelli's BE is given by $$\hat{l} = \underset{n}{\operatorname{argmax}}\left\{\sum_{k\in S_2}\sum_{i=m-1}^{m}|Y_i[k+n]|^2\right\}. \quad (26)$$

The following parameters were chosen for the simulations. The symbol in each subcarrier is taken from a QPSK constellation. The number of data samples N and the number of cyclic prefix samples $N_g$ in one OFDM symbol are 256 and 14, respectively, resulting in cyclic prefix width ratio $\alpha$ of $$\frac{N_g}{N} = \frac{7}{128}.$$

The maximum magnitude of the integer frequency offset is chosen as 4. The number of pilot subcarriers $N_1$ is fixed at 7, whereas the number of data subcarriers $N_2$ is chosen to be either 249 or 241. Thus, the number of used subcarriers $N_u=N_1+N_2$ is either 256 or 248.

Figure 3:
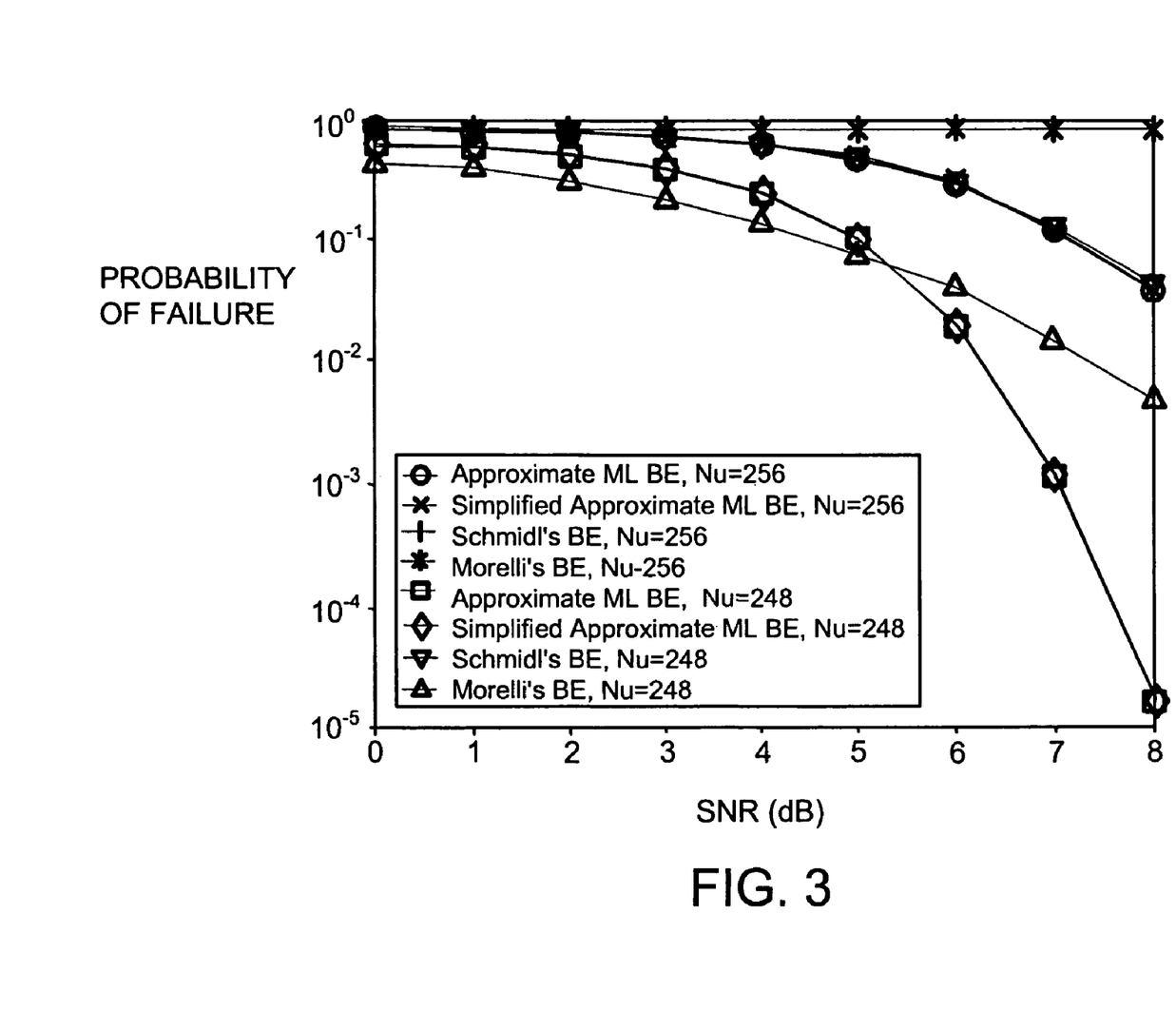
FIG. 3 is a plot showing the performance of blind estimators for an additive white Gaussian noise (AWGN) channel.

FIG. 3 illustrates the probability of the failure of the BEs for the AWGN channel. Schmidl's, Morelli's, exact ML, and approximate ML BEs are compared. For $N_u=256$, Schmidl's BE performs much better than Morelli's BE. This can be explained as follows. When all the subcarriers are used, a rotation of the subcarriers cannot be detected by measuring the energy of used subcarriers, i.e., the summation in Morelli's BE is constant regardless of n. The approximate ML BE, which uses both the phase shift property and the subcarrier rotation property, performs as well as Schmidl's BE. As can be seen from the plot, there is little loss in performance when the approximate ML BE is used instead of the exact ML BE. For $N_u=248$, the performance of Schmidl's BE almost remains the same as for $N_u=256$, whereas the performance of Morelli's BE improves significantly because Morelli's BE uses the property that the integer frequency offset causes a cyclic shift of subcarriers. However, Morelli's BE is outperformed by the exact and approximate ML BEs for high SNR. As expected from $N_u=248$, the performance of the approximate ML BE is almost as good as that of the exact ML BE for $N_u=256$.

Figure 4:
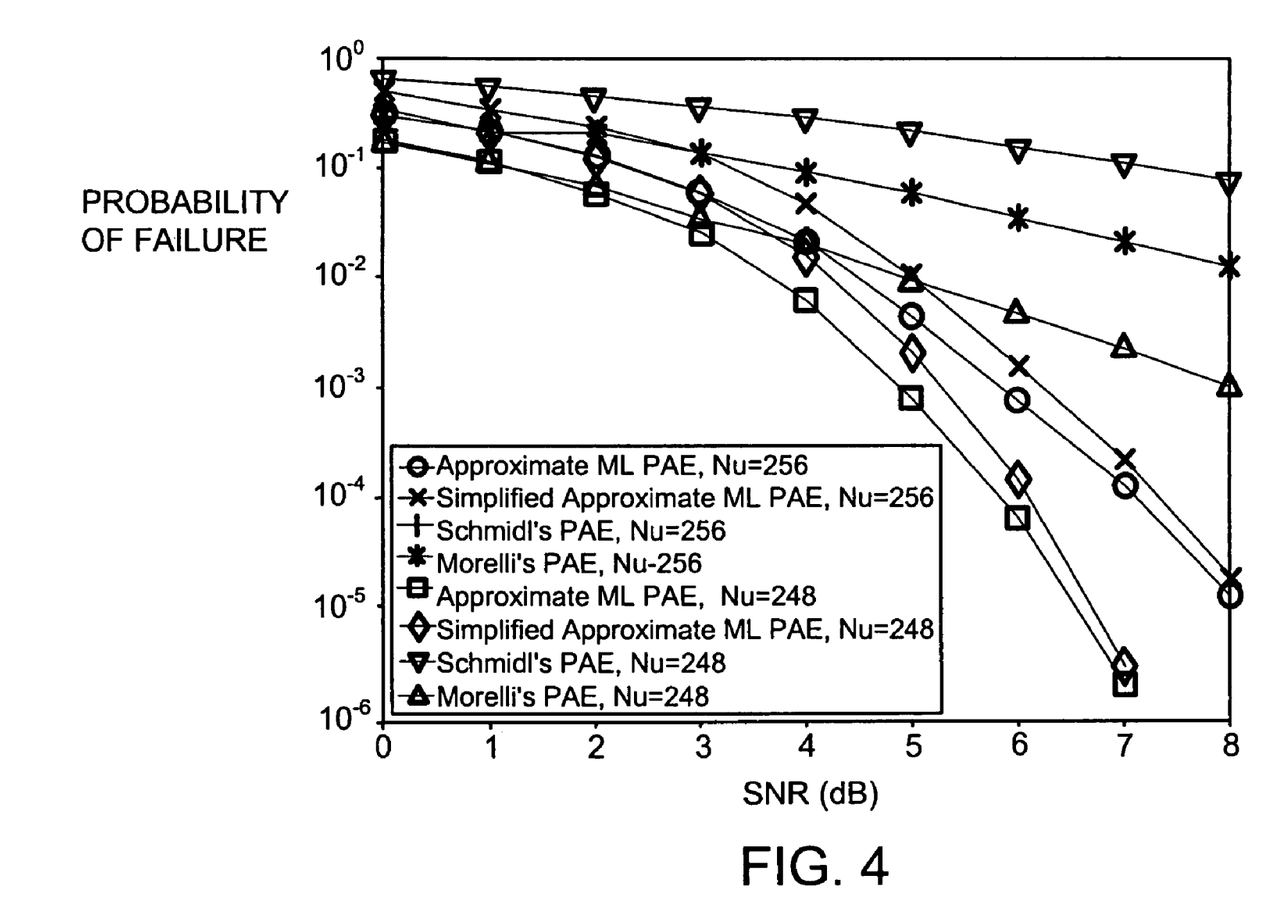
FIG. 4 is a plot showing the performance of pilot-aided estimators for an AWGN channel.

FIG. 4 illustrates the probability of the failure of the PAEs for the AWGN channel. Schmidl's PAE performance does not depend of the number of used subcarriers $N_u$ but only on the number of the pilot subcarriers $N_l$. On the other hand, the performance of Morelli's PAE and the ML PAEs depend not only on $N_l$ but also $N_u$. Since Morelli's PAE and the ML PAEs exploit the fact that the frequency offset causes a cyclic shift of subcarriers, the performance of Morelli's PAE and the ML PAEs is better for $N_u=248$ than for $N_u=256$. It can also be seen from the from the plot that Schmidl's PAE performs worse than both Morelli's PAE and the approximate ML PAE, and Morelli's PAE is outperformed by the approximate ML PAE for high SNR. Unlike the case for the blind estimators, the performance difference between the exact ML PAE and the approximate ML PAE is not negligible. However, the performance difference decreases as the SNR increases, as expected.

Figure 5:
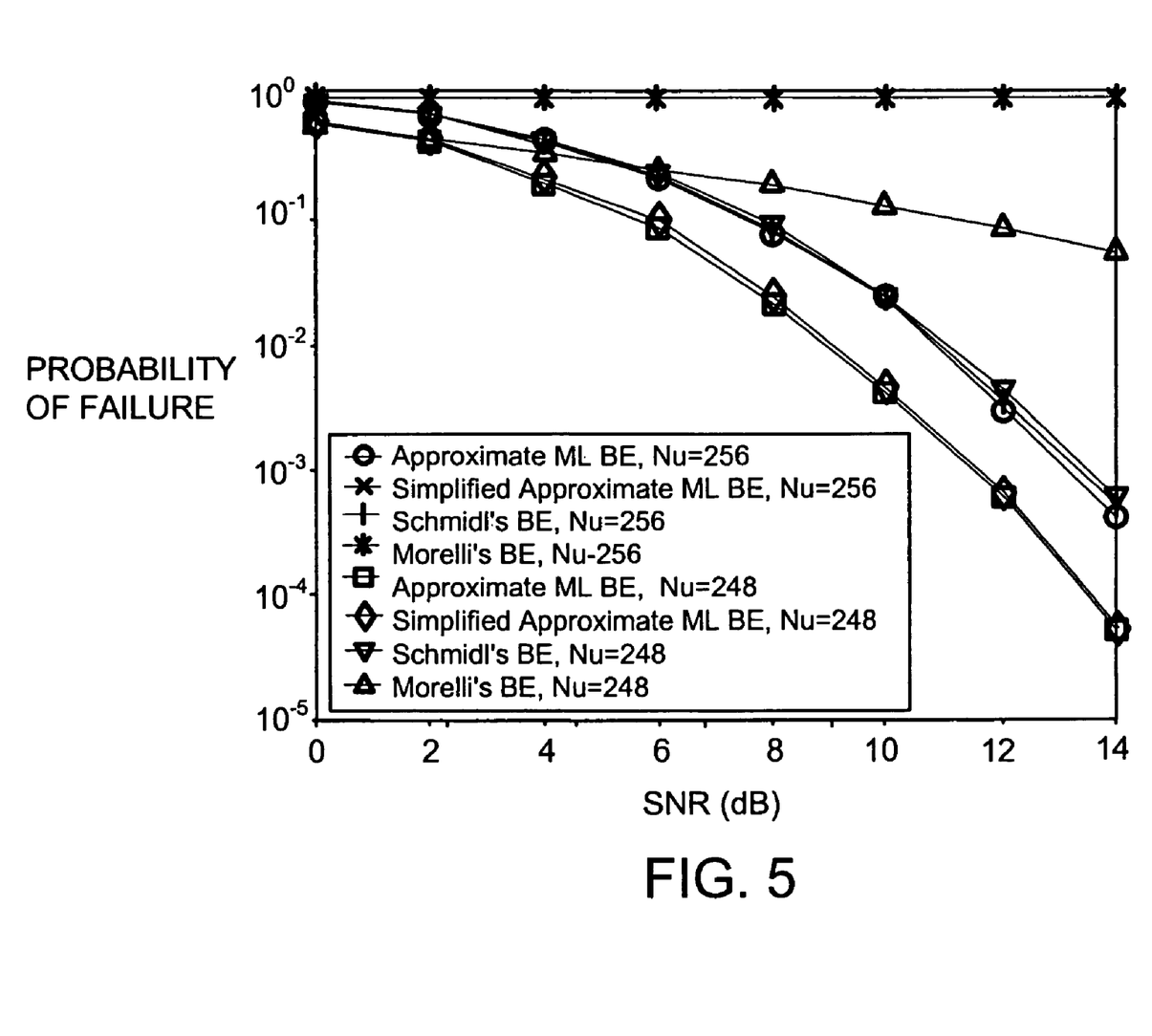
FIG. 5 is a plot showing the performance of blind estimators for multipath fading channels.
Figure 6:
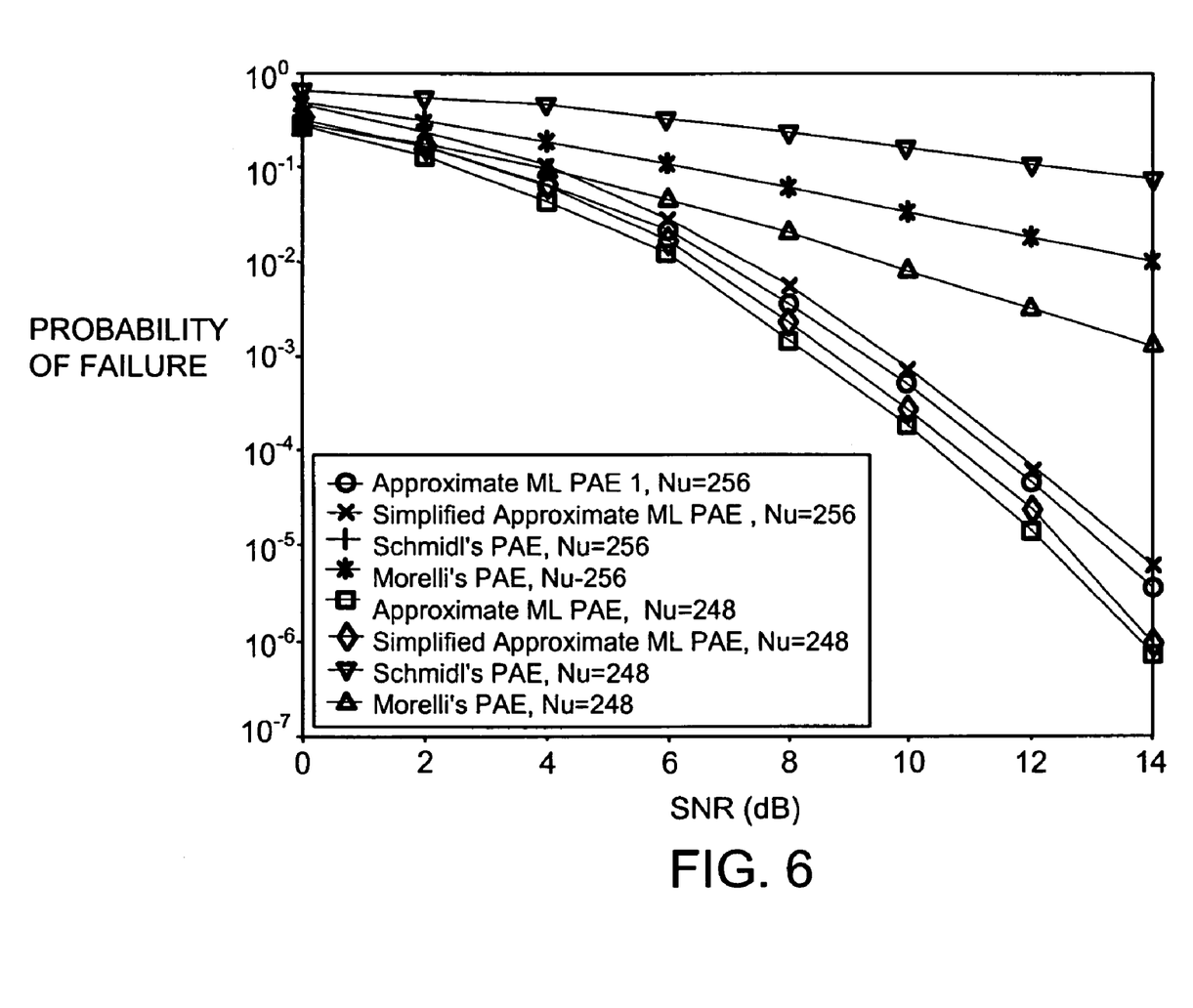
FIG. 6 is a plot showing the performance of pilot-aided estimators for multipath fading channels.

FIGS. 5 and 6 show the probability of failure of the BEs and PAES, respectively, for multipath fading channels. The multipath channel used in the simulation includes fifteen paths, each of which vary independently of each other with magnitude following the Rayleigh distribution and phase following the uniform distribution. The fifteen paths have an exponential power delay profile, and the root-mean-square delay spread of the multipath channel is two samples.

The simulation results for the multipath fading channel are similar to the results for the AWGN channel except that Morelli's BE performs worse than Schmidl's BE for $N_u=248$ and SNR larger than 6 dB. These results indicate that the exact and approximate ML estimators developed for the AWGN channel perform better than existing estimators even for the multipath channel, and especially for high SNR.

A number of embodiments have been described. Nevertheless, it will be understood that various modifications may be made without departing from the spirit and scope of the invention. For example, the integer frequency offset estimator can be implemented in other OFDM systems include, for example, fixed wireless access and digital audio broadcasting (DAB) and digital video broadcasting (DVB) systems. Also, blocks in the flowchart may be skipped or performed out of order and still produce desirable results. Accordingly, other embodiments are within the scope of the following claims.

The invention claimed is:

1. A method comprising: receiving a plurality of symbols, each symbol including a plurality of data samples; observing a plurality of data samples in adjacent symbols; and calculating an estimate of an integer portion of a carrier frequency offset based on a cyclic shift and a phase shift of the data samples between symbols, wherein calculating the estimate comprises applying multiple phase directions to each of the observed data samples to produce multiple magnitude measurements for each of the observed data samples, wherein said calculating the estimate comprises means for solving the equation:

$$\hat{l} = \underset{n}{\operatorname{argmax}}\{T(n)\}, \text{ where}$$

$$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where n is a symbol index, k is a subcarrier index, $S_2$ is a set of indices for data subcarriers, $\sigma_Z^2$ is a variance, $\alpha$ is a cyclic prefix width ratio, and V is an observation vector.

2. The method of claim 1, wherein each of the OFDM symbols further comprise a plurality of pilot samples corresponding to a plurality of pilot subcarriers in the OFDM symbols.

3. The method of claim 2, wherein said calculating comprises calculating the estimate of the integer portion of a carrier frequency offset based on a cyclic shift and a phase shift of the data subcarriers and the pilot subcarriers between symbols.

4. The method of claim 3, wherein said calculating the estimate comprises solving the equation:

$$\hat{l} = \underset{n}{\operatorname{argmax}}\{T(n)\}, \text{ where}$$

$$T(n) = \sum_{k \in S_1} \Re\{V[k+n]e^{-j2\pi n\alpha} A*[k]\} + \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

where n is a symbol index, k is a subcarrier index, $S_1$ is a set of indices for pilot subcarriers, $S_2$ is a set of indices for data subcarriers, $\sigma_Z^2$ is a variance, $\alpha$ is a cyclic prefix width ratio, V is an observation vector, and A is a sequence known to the apparatus.

5. The method of claim 1, further comprising:
transforming the received data samples into the frequency domain.

6. An apparatus comprising: an estimator including: a receiver to receive a plurality of symbols, each symbol including a plurality of data samples; a framer to observe a plurality of data samples in adjacent symbols; and a calculator to calculate an estimate of an integer portion of a carrier frequency offset based on a cyclic shift and a phase shift of the data samples between symbols, wherein the calculator is operative to calculate the estimate by applying multiple phase directions to each of the observed data samples to produce multiple magnitude measurements for each of the observed data samples, wherein the estimator is operative to calculate the estimate by solving the equation:

$$\hat{l} = \underset{n}{\mathrm{argmax}}\{T(n)\}, \text{ where}$$

$$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where n is a symbol index, k is a subcarrier index, $S_2$ is a set of indices for data subcarriers, $\sigma_Z^2$ is a variance, $\alpha$ is a cyclic prefix width ratio, and V is an observation vector.

7. The apparatus of claim 6, wherein each of the OFDM symbols further comprise a plurality of pilot samples corresponding to a plurality of pilot subcarriers in the OFDM symbols.

8. The apparatus of claim 7, wherein the estimator is operative to calculate the estimate of the integer portion of a carrier frequency offset based on a cyclic shift and a phase shift of the data subcarriers and the pilot subcarriers between OFDM symbols.

9. The apparatus of claim 8, wherein the estimator is operative to calculate the estimate by solving the equation:

$$\hat{l} = \underset{n}{\mathrm{argmax}}\{T(n)\}, \text{ where}$$

$$T(n) = \sum_{k \in S_1} \Re\{V[k+n]e^{-j2\pi n\alpha} A*[k]\} + \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

where n is a symbol index, k is a subcarrier index, $S_1$ is a set of indices for pilot subcarriers, $S_2$ is a set of indices for data subcarriers, $\sigma_Z^2$ is a variance, $\alpha$ is a cyclic prefix width ratio, V is an observation vector, and A is a sequence known to the receiver.

10. The apparatus of claim 6, further comprising:
a transform module to transform the data samples into the frequency domain.

11. An apparatus comprising: estimator means including: means for receiving a plurality of symbols, each symbol including a plurality of data samples; means for observing a plurality of data samples in adjacent symbols; and means for calculating an estimate of an integer portion of a carrier frequency offset based on a cyclic shift and a phase shift of the data samples between symbols, wherein the means for calculating the estimate comprises means for applying multiple phase directions to each of the observed data samples to produce multiple magnitude measurements for each of the observed data samples, wherein the estimator means further comprises means for solving the equation:

$$\hat{l} = \underset{n}{\mathrm{argmax}}\{T(n)\}, \text{ where}$$

$$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where n is a symbol index, k is a subcarrier index, $S_2$ is a set of indices for data subcarriers, $\sigma_Z^2$ is a variance, $\alpha$ is a cyclic prefix width ratio, and V is an observation vector.

12. The apparatus of claim 11, wherein each of the OFDM symbols further comprise a plurality of pilot samples corresponding to a plurality of pilot subcarriers in the OFDM symbols.

13. The apparatus of claim 12, wherein the estimator means further comprises means for calculating the estimate of the integer portion of a carrier frequency offset based on a cyclic shift and a phase shift of the data subcarriers and the pilot subcarriers between OFDM symbols.

14. The apparatus of claim 13, wherein the estimator means further comprises means for solving the equation:

$$\hat{l} = \underset{n}{\mathrm{argmax}}\{T(n)\}, \text{ where}$$

$$T(n) = \sum_{k \in S_1} \Re\{V[k+n]e^{-j2\pi n\alpha} A*[k]\} + \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

where n is a symbol index, k is a subcarrier index, $S_1$ is a set of indices for pilot subcarriers, $S_2$ is a set of indices for data subcarriers, $\sigma_Z^2$ is a variance, $\alpha$ is a cyclic prefix width ratio, V is an observation vector, and A is a sequence known to the estimator means.

15. The apparatus of claim 11, further comprising:
means for transforming the data samples into the frequency domain.

16. A computer program, encoded on a computer-readable medium, operable to cause data processing apparatus to perform operations comprising: receiving a plurality of symbols, each symbol including a plurality of data samples; observing a plurality of data samples in adjacent symbols; and calculating an estimate of an integer portion of a carrier frequency offset based on a cyclic shift and a phase shift of the data samples between symbols, wherein calculating the estimate comprises applying multiple phase directions to each of the observed data samples to produce multiple magnitude measurements for each of the observed data samples, wherein said calculating the estimate comprises solving the equation:

$$\hat{l} = \underset{n}{\mathrm{argmax}}\{T(n)\}, \text{ where}$$

$$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where where n is a symbol index, k is a subcarrier index, $S_2$ is a set of indices for data subcarriers, $\sigma_Z^2$ is a variance, $\alpha$ is a cyclic prefix width ratio, and V is an observation vector.

17. The computer program of claim 16, wherein each of the OFDM symbols further comprise a plurality of pilot samples corresponding to a plurality of pilot subcarriers in the OFDM symbols.

18. The computer program of claim 17, wherein said calculating comprises calculating the estimate of the integer portion of a carrier frequency offset based on a cyclic shift and a phase shift of the data subcarriers and the pilot subcarriers between symbols.

19. The computer program of claim 18, wherein said calculating the estimate comprises solving the equation:

$$\hat{l} = \operatorname*{argmax}_{n}\{T(n)\}, \text{ where}$$

$$T(n) = \sum_{k \in S_1} \Re\{V[k+n]e^{-j2\pi n\alpha} A*[k]\} + \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

where n is a symbol index, k is a subcarrier index, $S_1$ is a set of indices for pilot subcarriers, $S_2$ is a set of indices for data subcarriers, $\sigma_Z^2$ is a variance, $\alpha$ is a cyclic prefix width ratio, V is an observation vector, and A is a known sequence.

20. The computer program of claim 16, the operations further comprising:
    transforming the received data samples into the frequency domain.

21. A system comprising: one or more antennas to receive signals from a channel; and an estimator including: a receiver to receive a plurality of symbols, each symbol including a plurality of data samples; a framer to observe a plurality of data samples in adjacent symbols; and a calculator to calculate an estimate of an integer portion of a carrier frequency offset based on a cyclic shift and a phase shift of the data samples between symbols, wherein the calculator is operative to calculate the estimate by applying multiple phase directions to each of the observed data samples to produce multiple magnitude measurements for each of the observed data samples, wherein the estimator is operative to calculate the estimate by solving the equation:

$$\hat{l} = \operatorname*{argmax}_{n}\{T(n)\}, \text{ where}$$

$$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where n is a symbol index, k is a subcarrier index, $S_2$ is a set of indices for data subcarriers, $\sigma_Z^2$ is a variance, $\alpha$ is a cyclic prefix width ratio, and V is an observation vector.

22. The system of claim 21, wherein each of the OFDM symbols further comprise a plurality of pilot samples corresponding to a plurality of pilot subcarriers in the OFDM symbols.

23. The system of claim 22, wherein the estimator is operative to calculate the estimate of the integer portion of a carrier frequency offset based on a cyclic shift and a phase shift of the data subcarriers and the pilot subcarriers between OFDM symbols.

24. The system of claim 23, wherein the estimator is operative to calculate the estimate by solving the equation:

$$\hat{l} = \operatorname*{argmax}_{n}\{T(n)\}, \text{ where}$$

$$T(n) = \sum_{k \in S_1} \Re\{V[k+n]e^{-j2\pi n\alpha} A*[k]\} + \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

where n is a symbol index, k is a subcarrier index, $S_1$ is a set of indices for pilot subcarriers, $S_2$ is a set of indices for data subcarriers, $\sigma_Z^2$ is a variance, $\alpha$ is a cyclic prefix width ratio, V is an observation vector, and A is a sequence known to the estimator.

25. The system of claim 21, further comprising:
    a transform module to transform the data samples into the frequency domain.

26. A system comprising: antenna means for receiving signals from a channel; and estimator means including: means for receiving a plurality of symbols, each symbol including a plurality of data samples; means for observing a plurality of data samples in adjacent symbols; and means for calculating an estimate of an integer portion of a carrier frequency offset based on a cyclic shift and a phase shift of the data samples between symbols, wherein the means for calculating the estimate comprises means for applying multiple phase directions to each of the observed data samples to produce multiple magnitude measurements for each of the observed data samples, wherein the estimator means further comprises means for solving the equation:

$$\hat{l} = \operatorname*{argmax}_{n}\{T(n)\}, \text{ where}$$

$$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where n is a symbol index, k is a subcarrier index, $S_2$ is a set of indices for data subcarriers, $\sigma_Z^2$ is a variance, $\alpha$ is a cyclic prefix width ratio, and V is an observation vector.

27. The system of claim 26, wherein each of the OFDM symbols further comprise a plurality of pilot samples corresponding to a plurality of pilot subcarriers in the OFDM symbols.

28. The system of claim 27, wherein the estimator means further comprises means for calculating the estimate of the integer portion of a carrier frequency offset based on a cyclic shift and a phase shift of the data subcarriers and the pilot subcarriers between OFDM symbols.

29. The system of claim 28, wherein the estimator means further comprises means for solving the equation:

$$\hat{l} = \operatorname*{argmax}_{n}\{T(n)\}, \text{ where}$$

$$T(n) = \sum_{k \in S_1} \Re\{V[k+n]e^{-j2\pi n\alpha} A*[k]\} +$$

-continued
$$\sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

where n is a symbol index, k is a subcarrier index, $S_1$ is a set of indices for pilot subcarriers, $S_2$ is a set of indices for data subcarriers, $\sigma_Z^2$ is a variance, $\alpha$ is a cyclic prefix width ratio, V is an observation vector, and A is a sequence known to the estimator.

30. The system of claim 26, further comprising:
means for transforming the data samples into the frequency domain.

* * * * *